US008228789B2

(12) United States Patent
Tanuma

(10) Patent No.: US 8,228,789 B2
(45) Date of Patent: Jul. 24, 2012

(54) TRANSMISSION NETWORK, TRANSMISSION APPARATUS, CHANNEL SWITCHING METHOD AND PROGRAM FOR TRANSMISSION NETWORK

(75) Inventor: Hiroyuki Tanuma, Tokyo (JP)

(73) Assignee: NEC Corporation, Tokyo (JP)

( * ) Notice: Subject to any disclaimer, the term of this patent is extended or adjusted under 35 U.S.C. 154(b) by 185 days.

(21) Appl. No.: 12/477,785

(22) Filed: Jun. 3, 2009

(65) Prior Publication Data

US 2009/0303874 A1 Dec. 10, 2009

(30) Foreign Application Priority Data

Jun. 4, 2008 (JP) .................................. 2008-146945

(51) Int. Cl.
*H04L 1/00* (2006.01)
*H04L 12/26* (2006.01)
*H04L 12/28* (2006.01)
(52) U.S. Cl. ......... 370/227; 370/242; 370/351; 709/239
(58) Field of Classification Search .................. None
See application file for complete search history.

(56) References Cited

U.S. PATENT DOCUMENTS

| 7,529,183 | B2* | 5/2009 | Huck ............................ 370/226 |
| 7,764,599 | B2* | 7/2010 | Doi et al. ...................... 370/217 |
| 2002/0167898 | A1 | 11/2002 | Thang et al. |
| 2003/0016624 | A1* | 1/2003 | Bare ............................ 370/217 |
| 2003/0137932 | A1* | 7/2003 | Nishioka et al. ............. 370/216 |
| 2004/0103210 | A1* | 5/2004 | Fujii et al. .................... 709/239 |
| 2005/0013242 | A1* | 1/2005 | Chen et al. ................... 370/228 |
| 2005/0201273 | A1* | 9/2005 | Shimizu ....................... 370/216 |
| 2006/0146696 | A1* | 7/2006 | Li et al. ........................ 370/218 |
| 2006/0159009 | A1* | 7/2006 | Kim et al. .................... 370/216 |
| 2006/0203720 | A1* | 9/2006 | Kano ............................ 370/228 |
| 2006/0256712 | A1* | 11/2006 | Imajuku et al. .............. 370/218 |
| 2007/0165515 | A1* | 7/2007 | Vasseur ........................ 370/216 |
| 2007/0192451 | A1* | 8/2007 | Tran et al. .................... 709/223 |
| 2007/0286069 | A1* | 12/2007 | Xu ................................ 370/218 |
| 2008/0056294 | A1* | 3/2008 | Maeda et al. ................ 370/437 |
| 2008/0304494 | A1* | 12/2008 | Yokoyama ................... 370/400 |

FOREIGN PATENT DOCUMENTS

| JP | 1992342332 A | 11/1992 |
| JP | 1999308232 A | 11/1999 |
| JP | 2005333464 A | 12/2005 |
| JP | 2009010438 A | 1/2009 |

OTHER PUBLICATIONS

Combined Search and Examination Report for GB GB0919535.7 dated Sep. 24, 2009.

* cited by examiner

*Primary Examiner* — Chirag Shah
*Assistant Examiner* — Suk Jin Kang

(57) ABSTRACT

A transmission network according to the present invention includes an ingress transmission apparatus and relay or egress transmission apparatuses in network channel setting terms, wherein the ingress transmission apparatus includes a switching table in which to register in advance a channel to switch to from a certain channel in the network; a path calculation unit which calculates a channel path in said network and searches for a path to set; a channel switching unit which switches a failed channel in the network to a channel registered in the switching table or a channel searched by a path calculation unit, and a channel setting/removal unit which sends a SET CHANNEL or REMOVE CHANNEL instruction to the relay or egress transmission apparatus.

14 Claims, 17 Drawing Sheets

FIG. 6

SWITCHING TABLE FOR
TRANSMISSION APPARATUS a — 15

| PATH | STANDBY CHANNEL | PRIORITY |
|---|---|---|
| a-c-d-b | LSP1(P) | 2 |
|  |  |  |

FIG. 7

SWITCHING TABLE FOR
TRANSMISSION APPARATUS e — 15

| PATH | STANDBY CHANNEL | PRIORITY |
|---|---|---|
| e-c-d-f | LSP2(P) | 1 |
|  |  |  |

FIG. 8

RESOURCE AVAILABILITY INFORMATION

| LINK | AVAILABILITY FLAG |
|---|---|
| a-b | OFF |
| a-c | ON |
| c-d | ON |
| d-b | ON |
| d-f | ON |
| e-c | ON |
| e-f | OFF |
| e-g | ON |
| g-f | ON |

RESOURCE AVAILABILITY INFORMATION

| LINK | AVAILABILITY FLAG |
|------|-------------------|
| a-b | OFF |
| a-c | OFF |
| c-d | OFF |
| d-b | OFF |
| d-f | ON |
| e-c | ON |
| e-f | OFF |
| e-g | ON |
| g-f | ON |

RESOURCE AVAILABILITY INFORMATION

| LINK | AVAILABILITY FLAG |
|------|-------------------|
| a-b  | OFF |
| a-c  | OFF |
| c-d  | OFF |
| d-b  | OFF |
| d-f  | OFF |
| e-c  | OFF |
| e-f  | OFF |
| e-g  | ON |
| g-f  | ON |

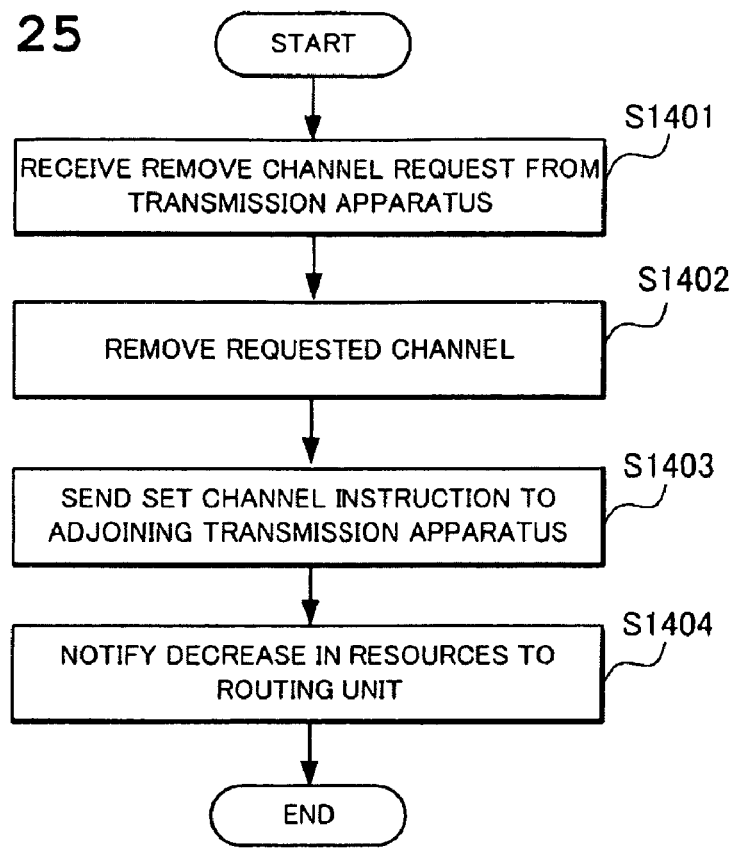
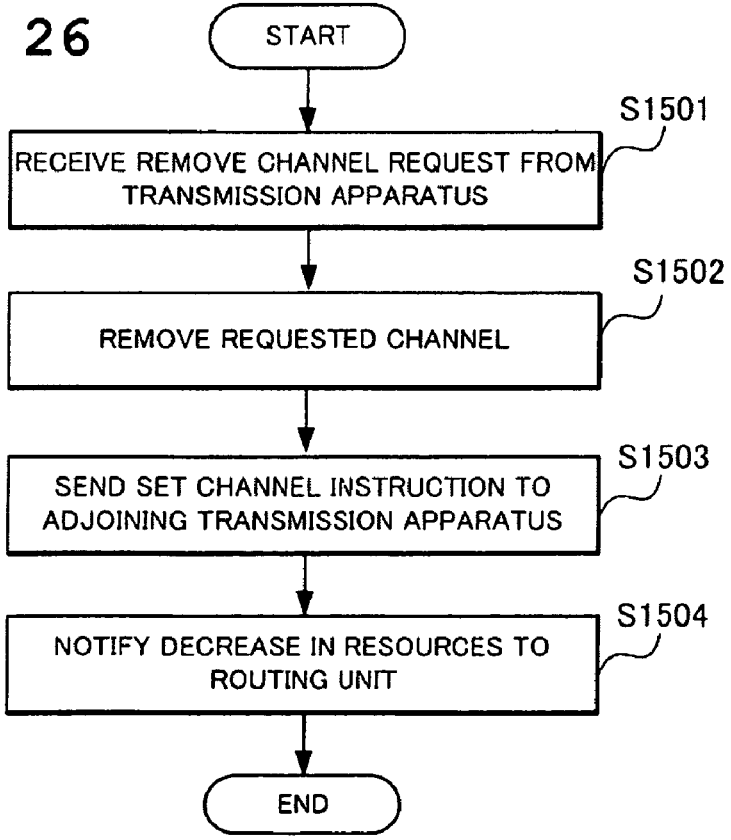

FIG. 27

RESOURCE AVAILABILITY INFORMATION

| LINK | AVAILABILITY FLAG |
|---|---|
| a-b | OFF |
| a-c | OFF |
| c-d | OFF |
| d-b | OFF |
| d-f | ON |
| e-c | ON |
| e-f | OFF |
| e-g | OFF |
| g-f | OFF |

TRANSMISSION NETWORK, TRANSMISSION APPARATUS, CHANNEL SWITCHING METHOD AND PROGRAM FOR TRANSMISSION NETWORK

INCORPORATION BY REFERENCE

This application is based upon and claims the benefit of priority from Japanese patent application No. 2008-146945, filed on Jun. 4, 2008, the disclosure of which is incorporated herein in its entirety by reference.

TECHNICAL FIELD

The present invention relates to a transmission network which consists of a plurality of transmission apparatuses. More particularly, the present invention relates to a transmission network, a transmission apparatus and a channel switching method and program for a transmission network which allow fast and flexible channel switching in a transmission network.

BACKGROUND ART

If a channel failure occurs along a path in a transmission network, one method for switching the channel to another is to preset a channel to switch to. Examples of such channel switching method are disclosed in, for example, Patent Literature 1 and Patent Literature 2.

In the channel switching method disclosed in Patent Literature 1, when the operation center receives a request from a user, it assigns the user a current channel and a standby channel and notifies the assignments to the test initiation station. If bands exist available for assignment, the test initiation station directs the terminal station to perform an assignment test via a relay station, using a switching cell. Upon the receipt of the switching cell, the relay station determines whether or not the bands exist available for assignment. If these bands are available, the relay station further sends out the switching cell toward the terminal station. Upon the receipt of the switching cell, the terminal station determines whether or not the bands exist available for assignment. If available, the terminal sets the standby channel and responds with an acknowledgement of successful completion to the test initiation station. The test initiation station receives a response from the terminal station and sets the standby channel if the response indicates successful completion.

In the channel switching method disclosed in Patent Literature 2, if a path failure occurs in a path for normal operation, a communication control unit on the host side detects the failure and issues a SWITCH CHANNEL request to a path switching unit. The path switching unit references a path switching table stored in an auxiliary storage and switches to an alternative channel corresponding to the faulty channel.

Patent Literature 1: Japanese Patent Laying-Open No. 1999-308232
Patent Literature 2: Japanese Patent Laying-Open No. 1992-342332

Both the channel switching methods for transmission network of Patent Literature 1 and Patent Literature 2 described above preset a channel to switch to for each of the channels and switch a faulty channel to another according such setting previously made for the faulty channel. This approach is problematic in that flexible channel switching is impossible because the channel to switch to is fixed for each channel.

OBJECT OF INVENTION

The present invention was made in light of the above-described problem. An object of the present invention is to provide a transmission network, a transmission apparatus and a channel switching method and program for a transmission network which can allow fast and flexible channel switching in a transmission network by not fixing a channel to switch to.

SUMMARY

According to a first exemplary aspect to the invention, a transmission network having an ingress transmission apparatus and a relay or egress transmission apparatuses in network channel setting terms, wherein
the ingress transmission apparatus includes a switching table in which to register in advance a channel to switch to from a certain channel in the network, a path calculation unit which calculates a channel path in the network and searches for a path to set, a channel switching unit which switches a faulty channel in the network to a channel registered in the switching table or a channel found in a search by the path calculation unit, and a channel setting/removal unit which sends a SET CHANNEL or REMOVE CHANNEL instruction to the relay or egress transmission apparatus.

According to a second exemplary aspect to the invention, a transmission apparatus which is an ingress transmission apparatus in network channel setting terms, includes a switching table in which to register in advance a channel to switch to from a channel in the network, a path calculation unit which calculates a channel path in the network and searches for a path to set, a channel switching unit which switches a faulty channel in the network to a channel registered in the switching table or a channel found in a search by the path calculation unit, and a channel setting/removal unit which sends a SET CHANNEL or REMOVE CHANNEL instruction to a relay or egress transmission apparatus.

According to a third exemplary aspect to the invention, a channel switching method for a transmission network, which transmission network includes an ingress transmission apparatus and a relay or egress transmission apparatuses in network channel setting terms, wherein the ingress transmission apparatus performing the steps of if a failure occurs in the network, switching the failed channel to a channel found by searching through a switching table in which channels to switch to from channels in the network are registered or to a channel path in the network determined by calculation by a path calculation unit, and
sending a SET CHANNEL or REMOVE CHANNEL instruction to a relay or egress transmission apparatus.

According to a fourth exemplary aspect to the invention, a computer-readable storage medium for storing a channel switching program which causes an ingress transmission apparatus of a transmission network including the ingress transmission apparatus and a relay or egress transmission apparatus in network channel setting terms to perform the processes of
if a failure occurs in the network, switching the failed channel to a channel found by searching through a switching table in which channels to switch to from channels in the network are registered or to a channel path in the network determined by calculation by a path calculation unit, and
sending a SET CHANNEL or REMOVE CHANNEL instruction to a relay or egress transmission apparatus.

According to the present invention, it becomes possible to perform channel switching flexibly because a channel to switch to is not fixed.

BRIEF DESCRIPTION OF THE DRAWINGS

FIG. 6 is a diagram which shows an example switching table for the transmission apparatus in the network structure of FIG. 3;

FIG. 7 is a diagram which shows an example switching table for the transmission apparatus in the network structure of FIG. 3;

FIG. 8 is a diagram which shows an example content of resource availability information held by the routing unit of each transmission apparatus in the network structure of FIG. 3;

FIG. 25 is a flow chart which explains the channel switching operation performed in the situation shown in FIG. 20;

FIG. 26 is a flow chart which explains the channel switching operation performed in the situation shown in FIG. 20;

FIG. 27 is a diagram which shows an example content of resource availability information held by the routing unit of each transmission apparatus in the network structure of FIG. 20.

EXEMPLARY EMBODIMENT

Exemplary embodiments of the present invention will now be described in detail with reference to the drawings.

Structure of the First Exemplary Embodiment

Figure 1:
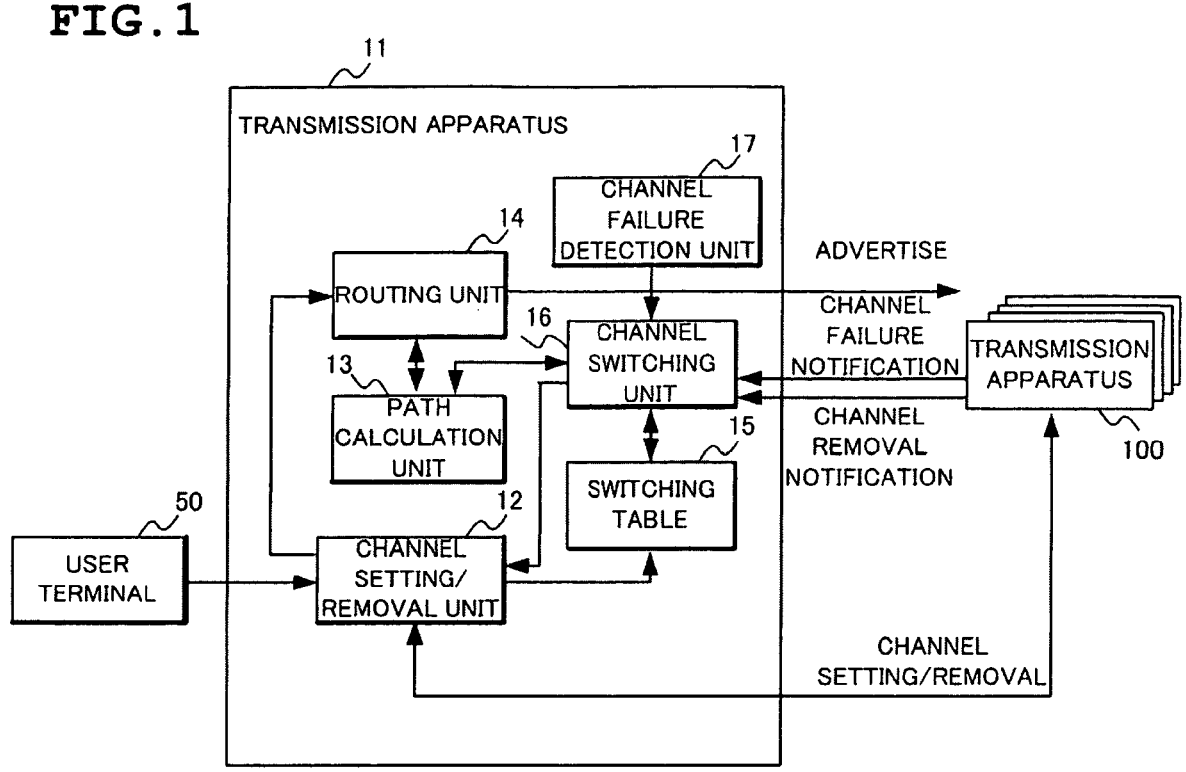
FIG. 1 is a block diagram which shows the structure of an ingress transmission apparatus according to an exemplary embodiment of the present invention.

FIG. 1 is a block diagram which shows the structure of a transmission apparatus to which reliability enhancement for a network channel is applied according to the first exemplary embodiment of the present invention.

The transmission apparatus 11 according to this exemplary embodiment serves as an ingress point in network channel setting terms, and comprises a channel setting/removal unit 12, a path calculation unit 13, a routing unit 14, a switching table 15, a channel switching unit 16 and a channel failure detection unit 17. A user terminal 50 and a plurality of transmission apparatuses 21 are connected to the transmission apparatus 11 via a network.

The channel setting/removal unit 12 has a function to set or remove a channel within the transmission apparatus 11. Using the function, the channel setting/removal unit 12 can set a standby channel in the switching table 15, in addition to a current channel, according to the settings supplied from the user terminal 50. The channel setting/removal unit 12 can also newly set a standby channel and remove the current channel of own apparatus according to a request from the channel switching unit 16 and output a SET/REMOVE CHANNEL instruction to the channels to an external transmission apparatus 21. Furthermore, in order to advertise the available resources of the transmission apparatus after setting/removing the channels, the channel setting/removal unit 12 notifies an increase or decrease in the resources to the routing unit 14.

The path calculation unit 13 has a function to calculate a channel path by use of the network resource information supplied from the routing unit 14, in response to a request from the channel switching unit 16 for a new channel path for a transmission apparatus within the network.

The routing unit 14 advertises the available resources within own transmission apparatus notified by the channel setting/removal unit 12 to other transmission apparatuses 21 within the network. The routing unit 14 holds information on all the available resources across the network by collecting resource availability information advertised by the other transmission apparatuses 21 within the network, so that it can respond with the network-wide resource availability information when requested by the path calculation unit 13.

The switching table 15 is used to hold the path of a standby channel set by the user terminal 50. The switching table 15 is referenced when the channel switching unit 16 switches the current channel to a standby channel.

The channel switching unit 16 switches the current channel to a standby channel when it receives a channel failure notification or a channel removal notification from the channel failure detection unit 17 or another transmission apparatus 21 within the network. Switching to a standby channel is performed by referencing the switching table 15, in which a high-priority channel to switch to has already been set among the channels to switch to that are registered in the switching table 15. If no other channels to switch to (standby channels) are registered in the switching table 15, the channel switching unit 16 uses the path calculation unit 13 to search for a new standby path, and requests the channel setting/removal unit 12 to make a channel switching setting.

The channel failure detection unit 17 notifies a channel failure that has occurred within own transmission apparatus to the channel switching unit 16.

The user terminal 50 is a terminal apparatus, such as a personal computer, which is connected by the user to a network. The user terminal 50 requests (directs) the transmission apparatus 11 to set/remove a channel. When setting a channel, the user terminal 50 specifies the priority of the channel.

The transmission apparatuses 100 are those within the network other than the ingress apparatus in channel setting terms. Each of the transmission apparatuses 21 serves as either a relay or an egress point on a channel.

Figure 2:
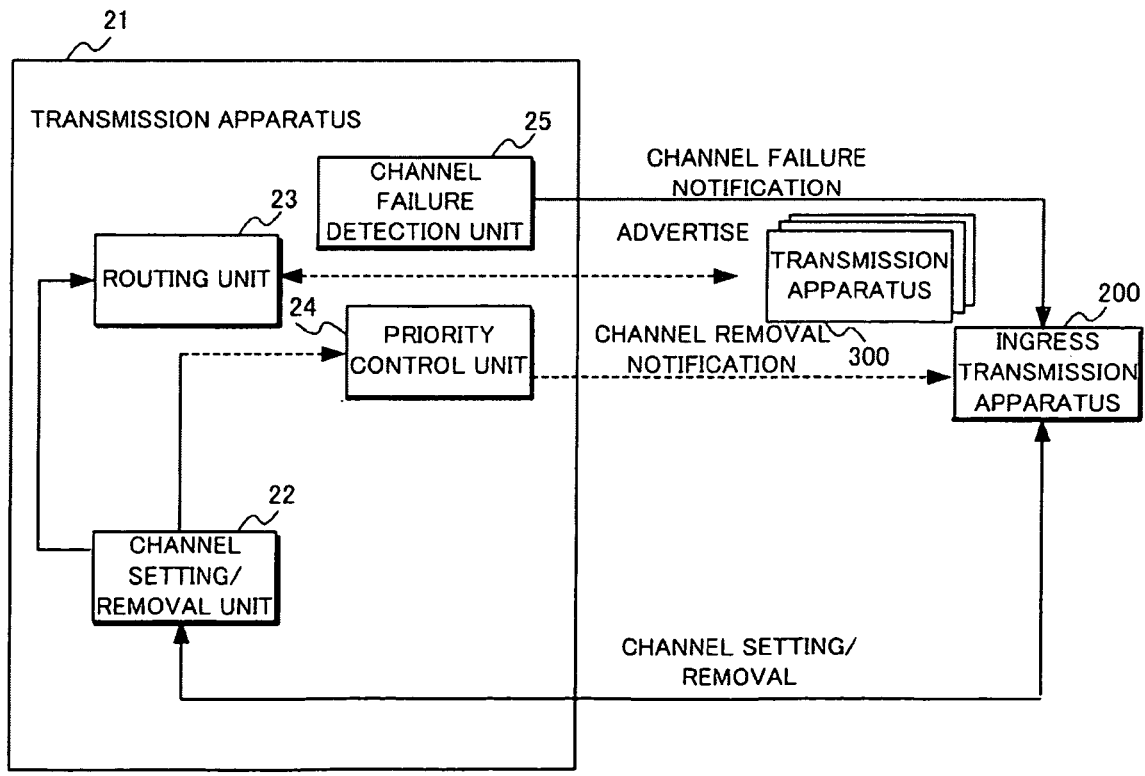
FIG. 2 is a block diagram which shows the structure of a transmission apparatus which serves as a relay or egress point according to an exemplary embodiment of the present invention.

FIG. 2 is a block diagram which shows the structure example of the transmission apparatus 21 to which reliability enhancement for a network channel is applied, according to a first exemplary embodiment of the present invention.

The transmission apparatus 21 is an apparatus which serves as a relay or egress point in channel setting terms, and comprises a channel setting/removal unit 22, a routing unit 23, a priority control unit 24 and a channel failure detection unit 25. An ingress transmission apparatus 11 in channel setting terms and a plurality of other transmission apparatuses 300 are connected to the transmission apparatus 21 via a network.

The channel setting/removal unit 22 has a function to set or remove a channel within the transmission apparatus. Based on a SET/REMOVE CHANNEL instruction from the ingress transmission apparatus 11, the channel setting/removal unit 22 performs a channel setting/removal operation on own transmission apparatus, and sends a SET/REMOVE CHANNEL instruction to the external transmission apparatus 21. The channel setting/removal unit 22 also issues a query to the priority control unit 24 to compare the priorities of the resources within own transmission apparatus between the channel to be newly set and the existing channel. Furthermore, in order to advertise the available resources of the transmission apparatus after the setting/removal of the channels, the channel setting/removal unit 22 notifies an increase or decrease in the resources to the routing unit 23.

The routing unit 23 has a function to advertise the available resources of own transmission apparatus notified from the channel setting/removal unit 22 to the other transmission apparatuses 300 and the ingress transmission apparatus 11 within the network, and a function to hold information on all the available resources across the network by collecting resource availability information advertised by the other transmission apparatuses 300 and the ingress transmission apparatus 11 within the network.

The priority control unit 24 has a function to, if within own transmission apparatus the resources for the channel to be newly set by the channel setting/removal unit 22 and those for the existing channel overlap with each other, compare the priorities set for these two channels and, if the priority for the new channel is higher, to send a channel removal notification to the ingress transmission apparatus 11.

The channel failure detection unit 25 has a function to notify a channel failure that has occurred within own transmission apparatus to the ingress transmission apparatus 11.

The transmission apparatus 11 is an ingress transmission apparatus for channel setting/removal purposes within a transmission apparatus shown in FIG. 1.

The transmission apparatus 300 is a transmission apparatus within the network other than the ingress apparatus in channel setting terms and includes a transmission apparatus which serves as a relay or an egress point on a channel.

The hardware structure of the transmission apparatuses 11, 21 according to the above-described exemplary embodiment will now be described with reference to FIG. 28.

Figure 28:
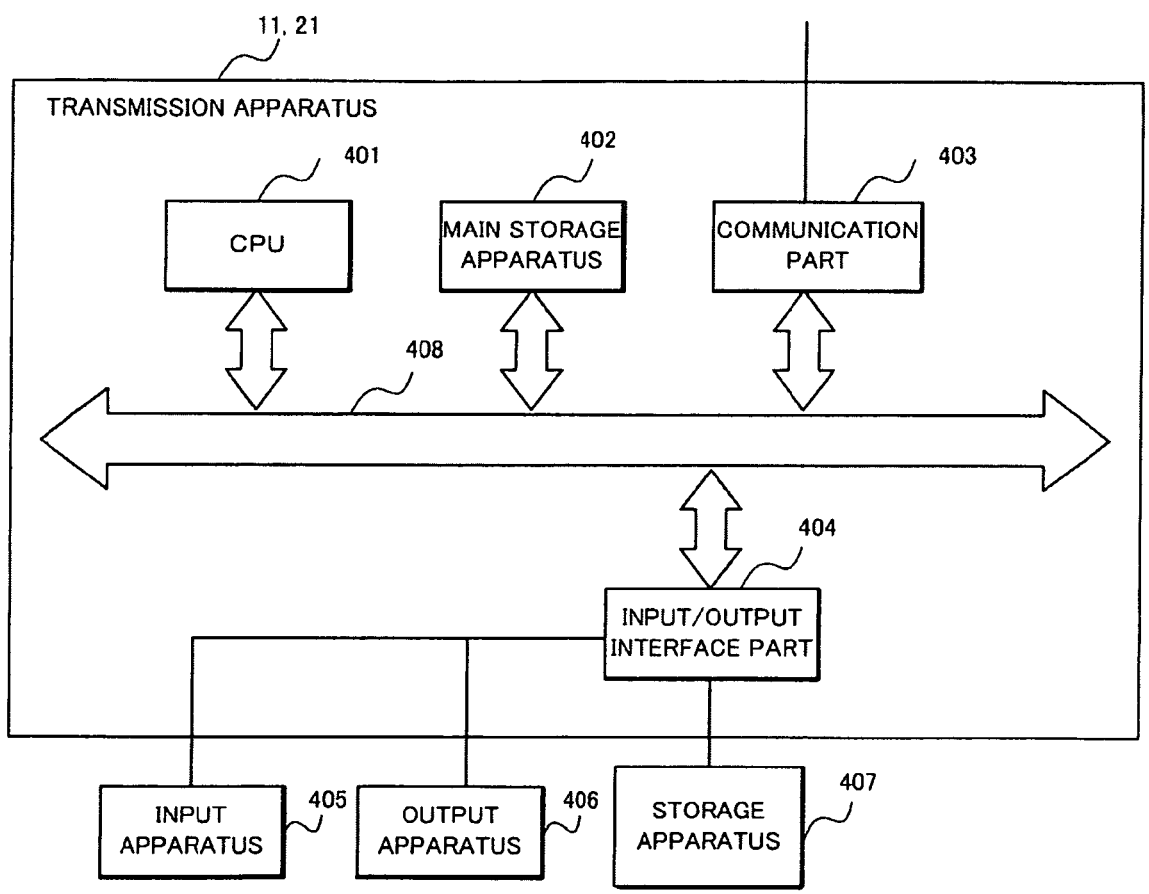
FIG. 28 is a block diagram which shows an example hardware structure for the transmission apparatus according to an exemplary embodiment of the present invention.

As shown in FIG. 28, the transmission apparatus 11, 21 can be realized in a hardware structure similar to a general computer apparatus, and comprises a CPU (Central Processing Unit) 401; a main storage apparatus 402, which is a main memory such as a RAM (Random Access Memory) and which is used as a data work area and/or a temporary save area; a communication part 403, which transmits and receives data to and from other nodes via a network; an input/output interface part 404, which is connected with an input apparatus 405, such as a mouse or a keyboard, an output apparatus 406, such as a display apparatus, and a storage apparatus 407, to transmit and receive data; and a system bus 408, which connects between the above-described components. The storage apparatus 407 is realized by using, for example, a hard disc apparatus which comprises a nonvolatile memory, such as a ROM (Read Only Memory), a magnetic disc and a semiconductor memory.

It goes without saying that the operation of the transmission apparatus 11, 21 according to this exemplary embodiment can be realized as hardware by implementing a circuit component, which is a hardware component, such as an LSI (Large Scale Integration), incorporating a program that controls the channel switching operation. In addition, it can also be realized as software by storing a program that provides the functions of the channel setting/removal unit 12, 22, the path calculation unit 13, the routing unit 14, 23, the channel switching unit 16, the priority control unit 24 and so on in the auxiliary storage part 405, loading the program into the main memory 402, and executing the program on the CPU 401.

Figure 3:
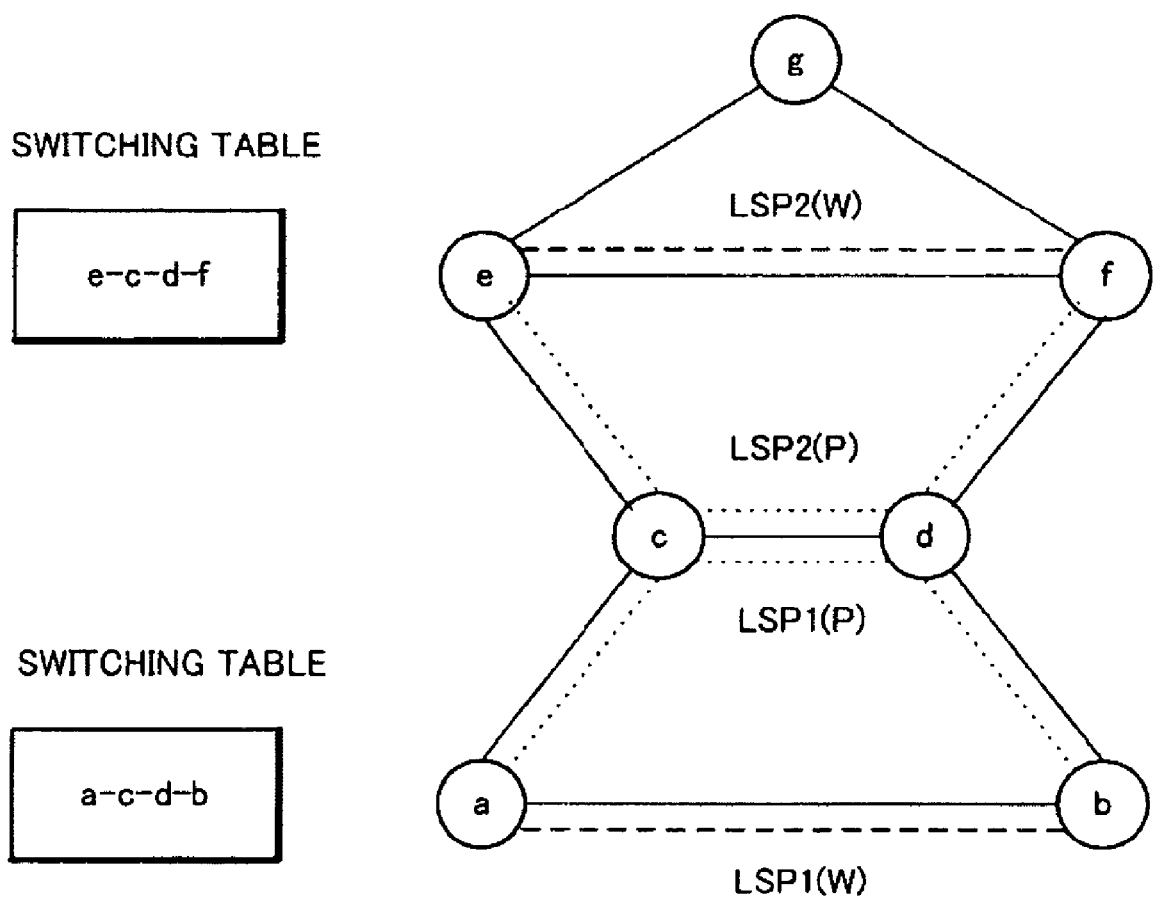
FIG. 3 is a diagram which shows an example transmission apparatus network structure that can realize reliability enhancement for a network channel.
Figure 4:
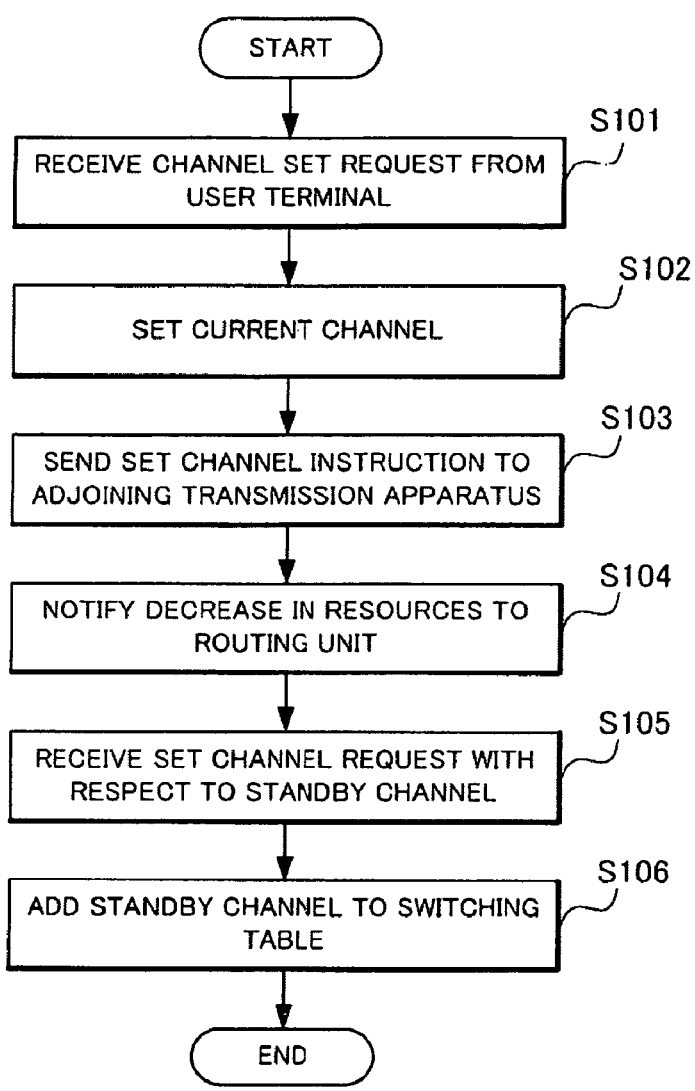
FIG. 4 is a flow chart which explains the channel setting operation in the example network structure of FIG. 3.
Figure 5:
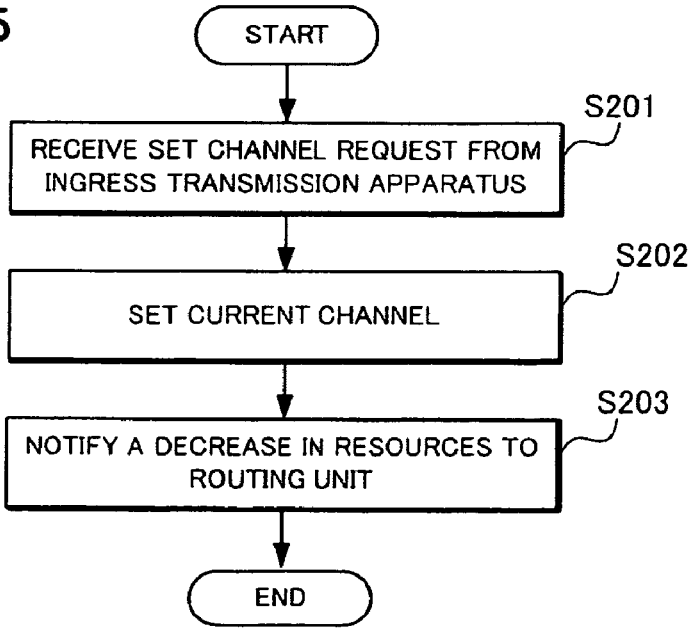
FIG. 5 is a flow chart which explains the channel setting operation in the example network structure of FIG. 3.

FIG. 3 is a diagram which shows an example transmission apparatus network structure that can realize reliability enhancement of a network channel.

The transmission apparatus a, e is a transmission apparatus 11 which serves as an ingress point in channel setting terms. The transmission apparatus c, d, g is a transmission apparatus 21 which serves as a relay point on a channel.

The transmission apparatus b, f is a transmission apparatus 21 which serves as an egress point on a channel.

LSP1(W) is a current channel with the transmission apparatus a serving as an ingress point.

LSP1(P) is a standby channel with the transmission apparatus a serving as an ingress point.

LSP2(W) is a current channel with the transmission apparatus e serving as an ingress point.

LSP2(P) is a standby channel with the transmission apparatus e serving as an ingress point.

In the network of FIG. 3, the standby channel LSP1(P) and the standby channel LSP2(P) are shared between the transmission apparatuses c, d.

Operation of the First Exemplary Embodiment

The operation according to the first exemplary embodiment will be described in detail with reference to FIGS. 1 to 27.

Within the network structure of FIG. 3, the transmission apparatus a is configured as an ingress apparatus in channel setting terms as shown in FIG. 1. The channel setting operation in such configuration will be described below, with reference to the flow charts in FIGS. 4 and 5.

The user terminal 50 sends a SET CHANNEL request to the channel setting/removal unit 12 of the transmission apparatus a to cause a current channel LSP1(W) to be set between the transmission apparatus a and the transmission apparatus b.

The channel setting/removal unit 12 of the transmission apparatus a receives the SET CHANNEL request from the user terminal 50 (Step S101); sets the current channel LSP1 (W) according to the SET CHANNEL request (Step S102); and sends a SET CHANNEL instruction to the external transmission apparatus b (Step S103). Then, in order to advertise the available resources of the transmission apparatus a after setting the channel, the channel setting/removal unit 12 of the transmission apparatus a notifies a decrease in the resources to the routing unit 14 (Step S104). The transmission apparatus a has a structure as shown in FIG. 1.

The channel setting/removal unit 22 of the transmission apparatus b receives the SET CHANNEL instruction from the transmission apparatus a (Step S201), and sets the current channel LSP1(W) according to the SET CHANNEL request (Step S202). In addition, in order to,advertise the available resources of the transmission apparatus b after setting the channel, the channel setting/removal unit 22 also notifies a decrease in the resources to the routing unit 23 of the transmission apparatus b (Step S203). The transmission apparatus b has a structure as shown in FIG. 2.

The user terminal 50 sends a SET CHANNEL request of the standby channel LSP1(P) to the channel setting/removal unit 12 of the transmission apparatus a to cause a standby channel LSP1(P) to be set between the transmission apparatuses a, c, d and b. The channel setting/removal unit 12 of the transmission apparatus a receives the SET CHANNEL request from the user terminal 50 (Step S105), and holds the path for the standby channel LSP1(P) in the switching table 15 according to the SET CHANNEL request (Step S106).

The user terminal 50 then sends a request to the channel setting/removal unit 12 of the transmission apparatus e to cause a current channel LSP2(W) to be set between the transmission apparatus e and the transmission apparatus f.

The channel setting/removal unit 12 of the transmission apparatus e receives the SET CHANNEL request from the user terminal 50 (Step S101); sets the current channel LSP2 (W) according to the SET CHANNEL request (Step S102); and sends a SET CHANNEL instruction to the external transmission apparatus f (Step S103). Furthermore, in order to advertise the available resources of the transmission apparatus after setting the channel, the channel setting/removal unit 12 also notifies a decrease in the resources to the routing unit 14 (Step S104). The transmission apparatus e has a structure as shown in FIG. 1.

The channel setting/removal unit 22 of the transmission apparatus f receives the SET CHANNEL instruction from the transmission apparatus e (Step S201); sets the current channel LSP2(W) according to the SET CHANNEL request (Step S202); and, in order to advertise the available resources of the transmission apparatus after setting the channel, notifies a decrease in the resources to the routing unit 23 (Step S203).

The user terminal 50 sends a request to the channel setting/removal unit 12 of the transmission apparatus e to cause a standby channel LSP2(P) to be set between the transmission apparatuses e, c, d and f. The channel setting/removal unit 12 of the transmission apparatus e receives the SET CHANNEL request from the user terminal (Step S105), and adds the path for the standby channel LSP1(P) to the switching table 15 according to the SET CHANNEL request (Step S106).

FIGS. 6 and 7 show example structures of the switching tables 15 of the transmission apparatus a and the transmission apparatus e at this stage. As shown in the figures, the standby channel LSP1(P) along a path a-c-d-b is set in the switching table 15 of the transmission apparatus a; and the standby channel LSP2(P) along a path e-c-d-f in the switching table 15 of the transmission apparatus e. In addition, each of the standby channels has a priority set thereto. In the examples of FIGS. 6 and 7, the standby channel LSP2 (P) has a higher priority than the standby channel LSP1 (P).

FIG. 8 shows an example of content of resource availability information held by the routing unit 14, 23 of the transmission apparatuses a-g, which make up the network of FIG. 3. The resource availability information held by the routing unit 14, 23 is common across all the transmission apparatuses. In other words, the routing unit 14 of the ingress transmission apparatuses a, e hold the same resource availability information as the information held by the routing unit 23 of the relay transmission apparatuses c, d, g and the routing unit 23 of the egress transmission apparatuses b, f.

As shown in FIG. 8, resource availability information consists of information on the links between two transmission apparatuses which are utilized as paths on the network made up of the transmission apparatuses a-g, as well as availability flags which indicate whether or not these links are currently available. The routing unit 14, 23 turns on or off an availability flag based on a notification of an increase or decrease in links (resources) after a channel is set or removed.

In the case of the example of FIG. 3, the availability flags for the link a-b and the link e-f are set to OFF (used) because they are being utilized by the current channel LSP1 (W) and LSP2 (W), and the rest of the flags are set to ON (not used) to indicate that they are currently available.

Figure 9:
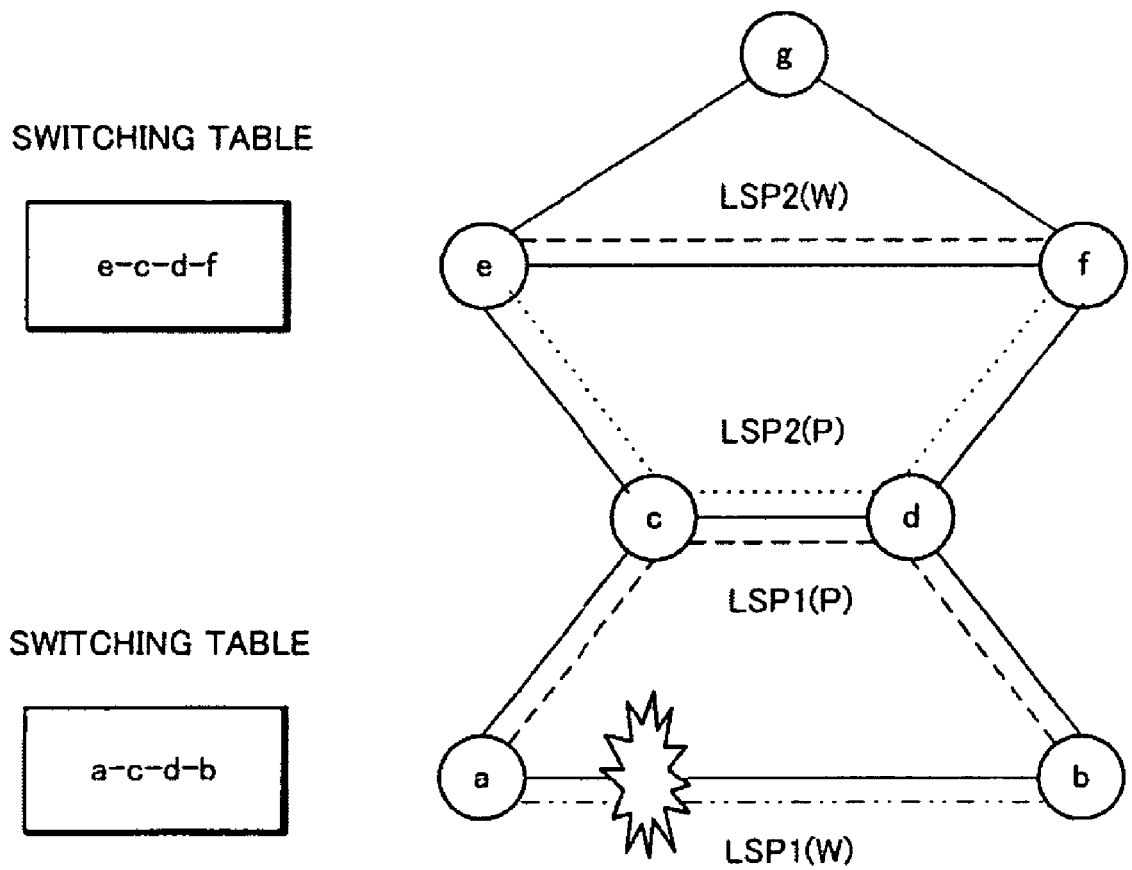
FIG. 9 is a diagram which shows a situation where a failure has occurred in the current channel LSP1(W) during the state shown in FIG. 3.
Figure 10:
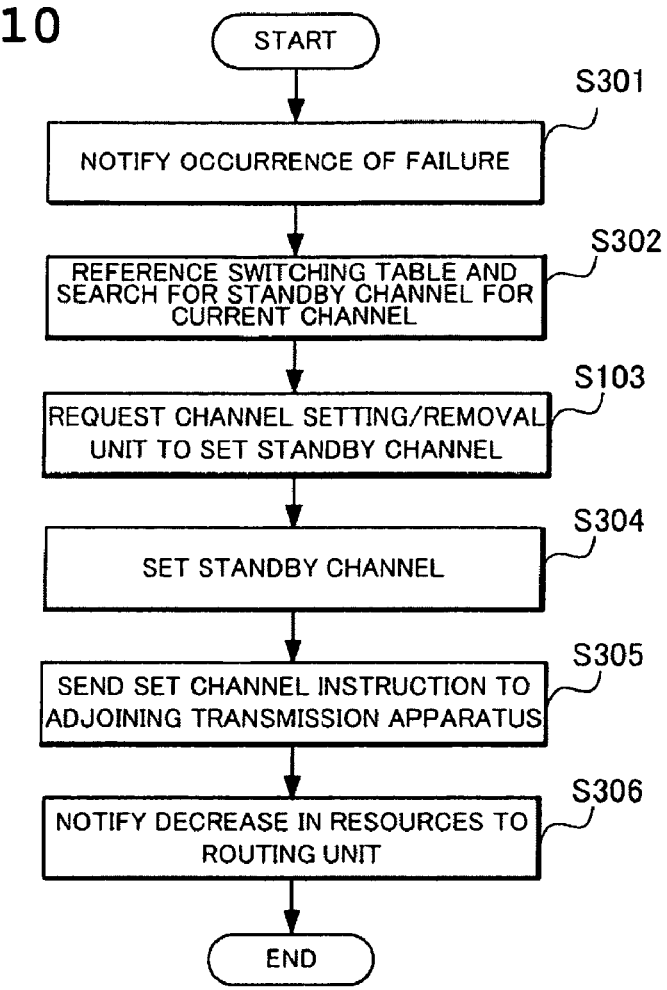
FIG. 10 is a flow chart which explains the operation performed in the situation shown in FIG. 9 in order to switch the current channel LSP1(W) to a standby channel LSP1(P)
Figure 11:
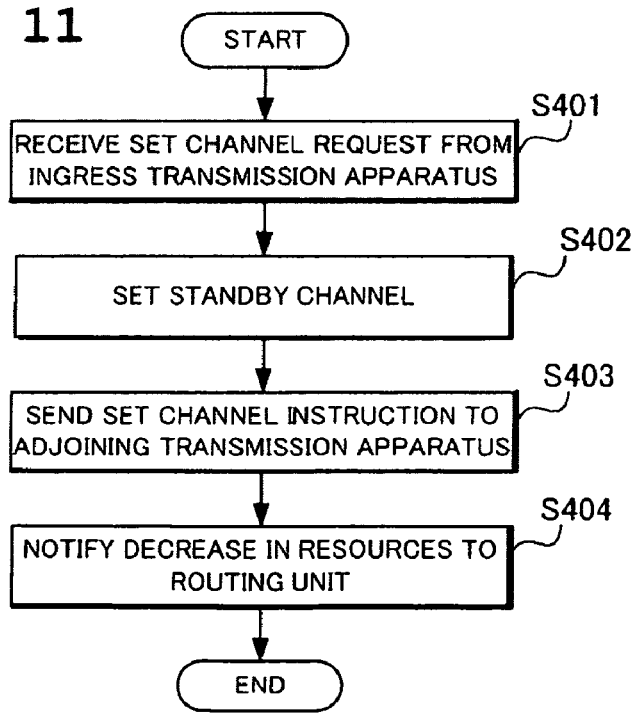
FIG. 11 is a flow chart which explains the operation performed in the situation shown in FIG. 9 in order to switch the current channel LSP1(W) to a standby channel LSP1(P)

FIG. 9 shows a situation where a failure has occurred in the current channel LSP1 (W) during the state shown in FIG. 3. Below, the operation performed to switch from the current channel LSP1 (W) to the standby channel LSP1 (P) will be described with reference to the flow charts of FIGS. 10 to 12.

Upon detection of a channel failure, the failure detection unit 17 of the transmission apparatus a notifies the occurrence of the failure to the channel switching unit 16 (Step S301).

The channel switching unit 16 of the transmission apparatus a references the switching table 15 and searches for a standby channel LSP1 (P) for the current channel LSP1 (W) (Step S302).

The channel switching unit 16 of the transmission apparatus a issues a request to the channel setting/removal unit 12 of the transmission apparatus a, requesting the latter to set the standby channel LSP1 (P) between the transmission apparatuses a, c, d, b, which form a path for the LSP1 (P) (Step S303).

The channel setting/removal unit 12 of the transmission apparatus a sets the standby channel LSP1 (P) (Step S304), and issues a SET CHANNEL instruction with respect to the standby channel LSP1 (P) to the adjoining transmission apparatus c (Step S305).

Then, in order to advertise the available resources of the transmission apparatus after setting the channel, the channel setting/removal unit 12 notifies a decrease in the resources to the routing unit 14 (Step S306).

The channel setting/removal unit 22 of the transmission apparatus c receives the SET CHANNEL instruction from the transmission apparatus a (Step S401); sets the standby channel LSP1 (P) according to the SET CHANNEL request (Step S402); sends a SET CHANNEL instruction to the adjoining transmission apparatus d (Step S403); and, in order to advertise the available resources of the transmission apparatus after setting the channel, notifies a decrease in the resources to the routing unit 23 (Step S404).

The channel setting/removal unit 22 of the transmission apparatus d receives the SET CHANNEL instruction from the transmission apparatus c (Step S401); sets the standby channel LSP1 (P) according to the SET CHANNEL request (Step S402); sends a SET CHANNEL instruction to the adjoining transmission apparatus b (Step S403); and, in order to advertise the available resources of the transmission apparatus after setting the channel, notifies a decrease in the resources to the routing unit 23 (Step S404).

The channel setting/removal unit 22 of the transmission apparatus b receives the SET CHANNEL instruction from the transmission apparatus d (Step S501); sets the standby channel LSP1 (P) according to the SET CHANNEL request (Step S502); and, in order to advertise the available resources of the transmission apparatus after setting the channel, notifies a decrease in the resources to the routing unit 23 (Step S503).

As for the current channel LSP1 (W), which has suffered a failure, the channel may be either removed by the transmission apparatus a, b, or its path may be retained so that it can be brought back as the current channel LSP1 (W) after the failure is resolved.

On completion of the procedure described above, the standby channel LSP1 (P) is set between the transmission apparatuses a, c, d, b.

Figures 12, 13:
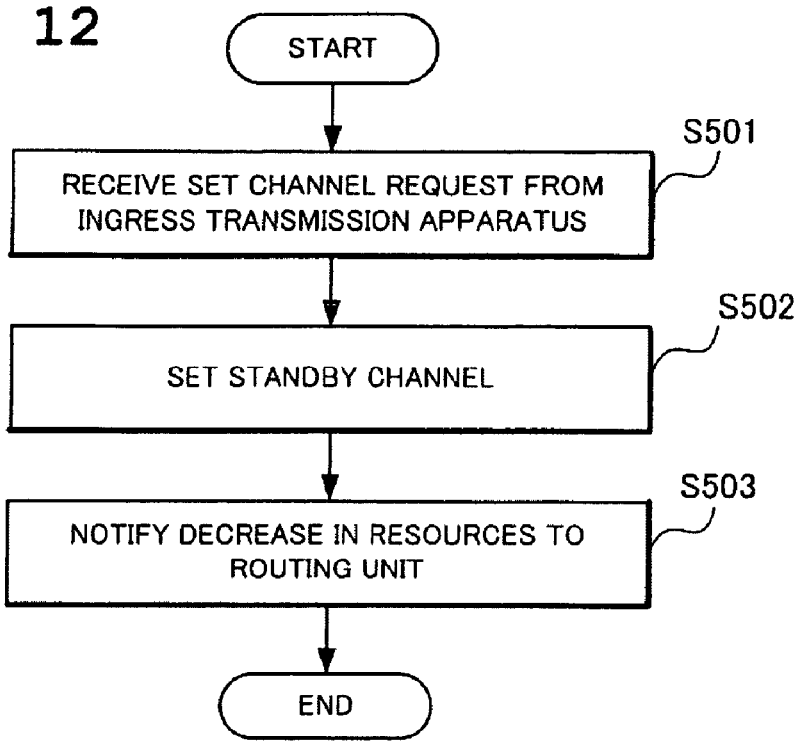
FIG. 12 is a flow chart which explains the operation performed in the situation shown in FIG. 9 in order to switch the current channel LSP1(W) to a standby channel LSP1(P)
FIG. 13 is a diagram which shows an example content of resource availability information held by the routing unit of each transmission apparatus in the network structure of FIG. 9.

In this case, the resource availability information for each of the transmission apparatuses is revised so that the availability flags for the links a-c, c-d, and d-b are set to OFF as shown in FIG. 13, because these links are not used by the standby channel LSP1 (P) anymore.

Figure 14:
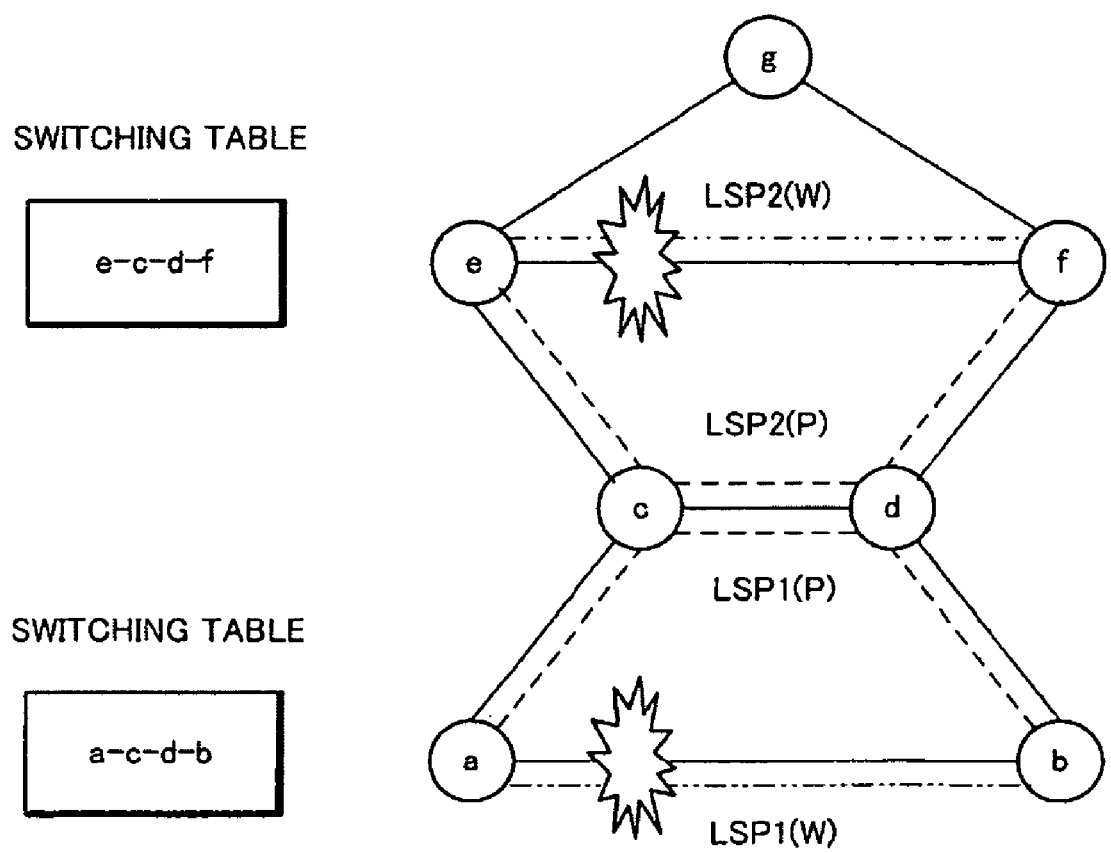
FIG. 14 is a diagram which shows a situation where a failure has occurred in a current channel LSP2(W) after the state shown in FIG. 9.
Figure 15:
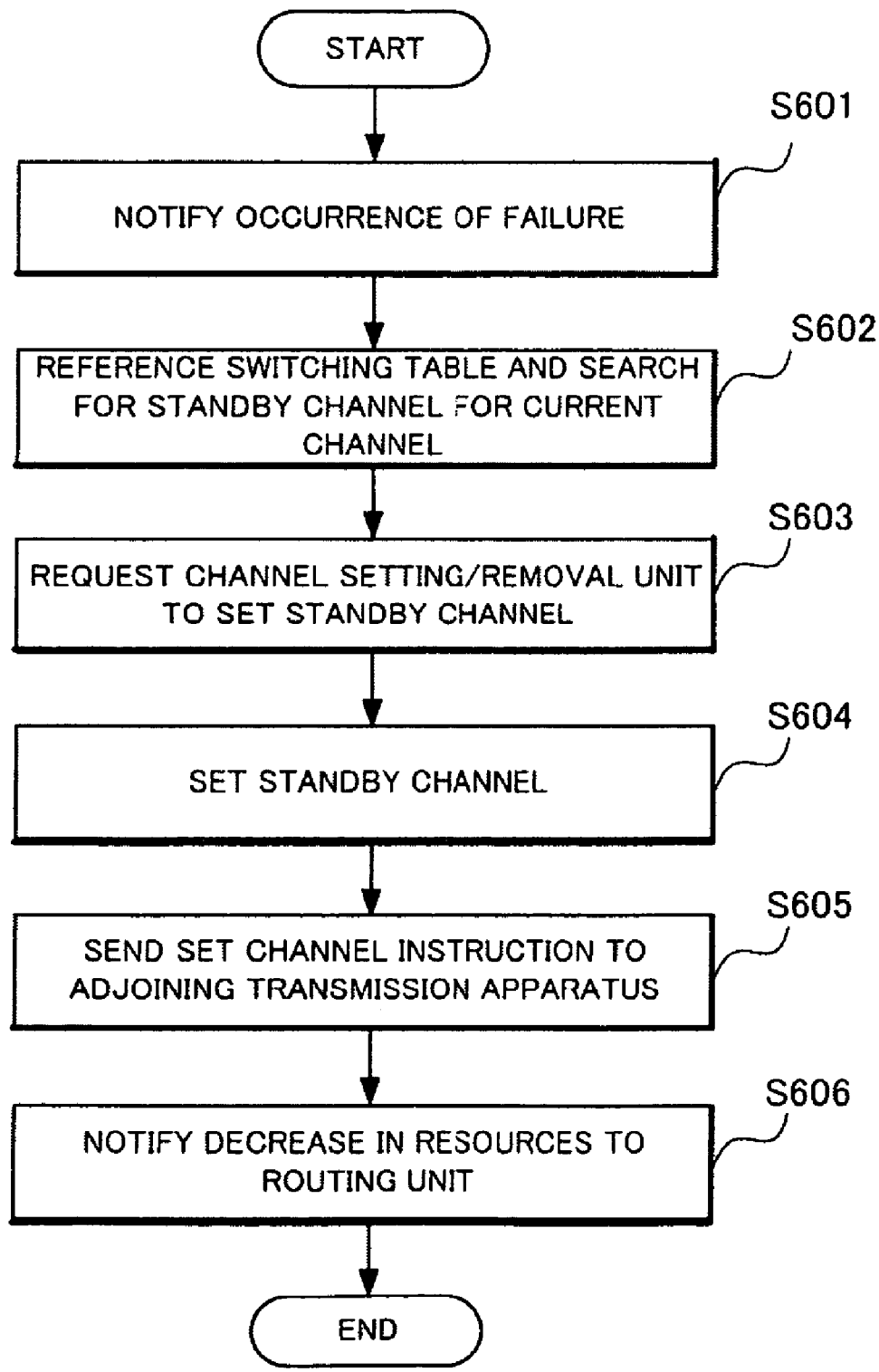
FIG. 15 is a flow chart which explains the operation performed in the situation shown in FIG. 14 in order to switch the current channel LSP2(W) to a standby channel LSP2(P)
Figure 16:
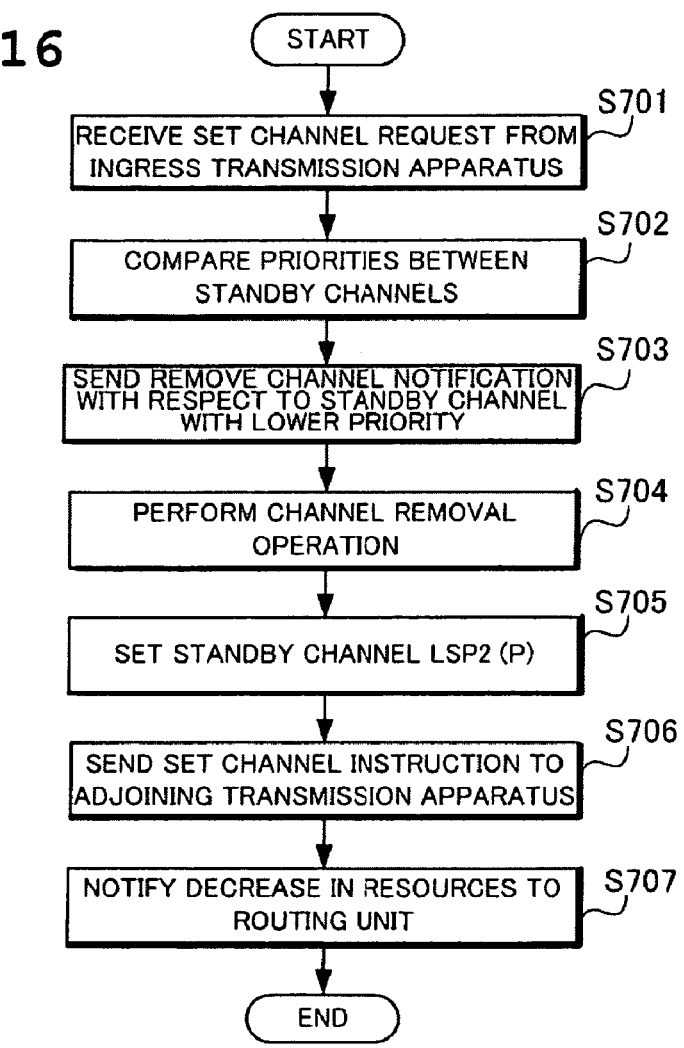
FIG. 16 is a flow chart which explains the operation performed in the situation shown in FIG. 14 in order to switch the current channel LSP2(W) to a standby channel LSP2(P)
Figure 17:
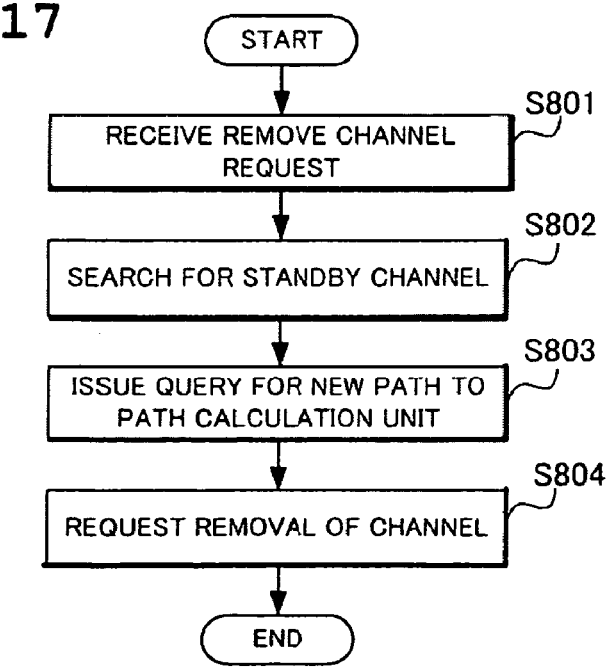
FIG. 17 is a flow chart which explains the operation performed in the situation shown in FIG. 14 in order to switch the current channel LSP2(W) to a standby channel LSP2(P)

FIG. 14 shows a situation where a failure has occurred in the current channel LSP2 (W) after the state shown in FIG. 9. The operation performed to switch the current channel LSP2 (W) to the standby channel LSP2 (P) will be describe below, with reference to FIGS. 15 to 18.

Upon detection of a channel failure, the failure detection unit 17 of the transmission apparatus e notifies the occurrence of the failure to the channel switching unit 16 (Step S601).

The channel switching unit 16 of the transmission apparatus e references the switching table 15 and searches for a standby channel LSP2 (P) for the current channel LSP2 (W) (Step S602).

The channel switching unit 16 of the transmission apparatus e issues a request to the channel setting/removal unit 12 of the transmission apparatus e, requesting the latter to set the standby channel LSP2 (P) between the transmission apparatuses e, c, d, f, which form a path for the LSP2 (P) (Step S603).

The channel setting/removal unit 12 of the transmission apparatus e sets the standby channel LSP2 (P) (Step S604), and issues a SET CHANNEL instruction with respect to the standby channel LSP2 (P) to the adjoining transmission apparatus c (Step S605).

In order to advertise the available resources of the transmission apparatus after setting the channel, the channel setting/removal unit 12 of the transmission apparatus e notifies a decrease in the resources to the routing unit 14 (Step S606).

The channel setting/removal unit 22 of the transmission apparatus c receives the SET CHANNEL request from the transmission apparatus e (Step S701) and attempts to set the standby channel LSP2 (P) according to the SET CHANNEL request. However, since the channel has already been set by LSP1 (P), the channel setting/removal unit 22 instead causes the priority control unit 24 to compare the channel priorities between the standby channel LSP1 (P) and the standby channel LSP2 (P) (Step S702).

If the priority of the standby channel LSP2 (P) is higher, the priority control unit 24 sends a REMOVE CHANNEL notification with respect to the standby channel LSP1 (P), whose priority is lower, to the ingress transmission apparatus a in channel setting terms (Step S703).

Upon receipt of the REMOVE CHANNEL notification from the transmission apparatus c (Step S801), the channel switching unit 16 of the transmission apparatus a references the switching table 15 and searches for a standby channel for the current channel LSP1 (W) (Step S802).

In case the switching table 15 does not contain a standby path for the LSP1 (W), the channel switching unit 16 issues a query to the path calculation unit 13 to check whether a new path exists or not (Step S803).

In the case of FIG. 14, the attempt to set a new path fails because no standby path exists for LSP1 (W).

The channel switching unit 16 of the transmission apparatus a issues a REMOVE CHANNEL request with respect to LSP1 (P) to the channel setting/removal unit 22 of the transmission apparatus c (Step S804).

The channel setting/removal unit 22 of the transmission apparatus c then performs a channel removal operation on LSP1 (P) (Step S704). After confirming the successful removal of LSP1 (P), the channel setting/removal unit 22 of the transmission apparatus c sets the standby channel LSP2 (P) according to the SET CHANNEL request (Step S705); sends a SET CHANNEL instruction and a REMOVE CHANNEL request with respect to LSP1 (P) to the adjoining transmission apparatus d (Step S706); and, in order to advertise the available resources of the transmission apparatus after setting the channel, notifies a decrease in the resources to the routing unit 23 (Step S707).

The channel setting/removal unit 22 of the transmission apparatus d receives the SET CHANNEL instruction and the REMOVE CHANNEL request from the transmission apparatus c (Step S901); performs a channel removal operation on LSP1 (P) according to the REMOVE CHANNEL request (Step S902); sets the standby channel LSP2 (P) according to the SET CHANNEL request (Step S903); sends a SET CHANNEL instruction to the adjoining transmission apparatus d (Step S904); and, in order to advertise the available resources of the transmission apparatus after setting the channel, notifies a decrease in the resources to the routing unit 23 (Step S905).

The channel setting/removal unit 22 of the transmission apparatus f receives the SET CHANNEL instruction from the-transmission apparatus d (Step S1001); sets the standby channel LSP2 (P) according to the SET CHANNEL request (Step S1002); and, in order to advertise the available resources of the transmission apparatus after setting the channel, notifies a decrease in the resources to the routing unit 23 (Step S1003).

As for the current channel LSP2 (W), which has suffered a failure, the channel may be either removed by the transmission apparatus e, f, or its path may be retained so that it can be brought back as the current channel LSP2 (W) after the failure is resolved. The path will also be retained instead of being removed if the band has plenty of room for paths.

On completion of the procedure described above, the standby channel LSP2 (P) is set between the transmission apparatuses e, c, d, f.

Figures 18, 19:
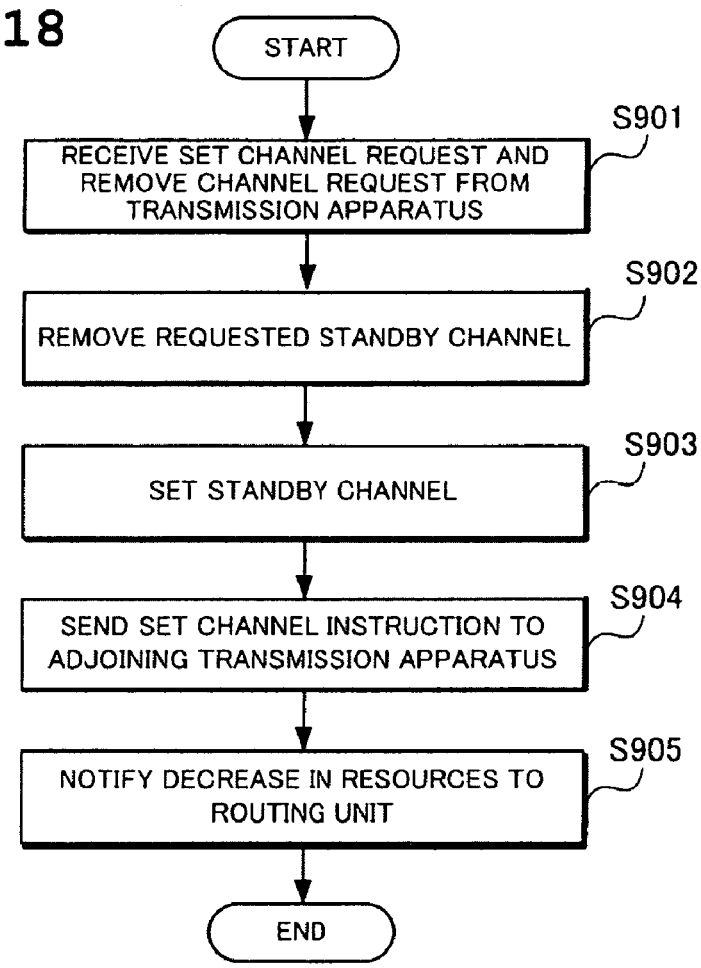
FIG. 18 is a flow chart which explains the operation performed in the situation shown in FIG. 14 in order to switch the current channel LSP2(W) to a standby channel LSP2(P)
FIG. 19 is a diagram which shows an example content of resource availability information held by the routing unit of each transmission apparatus in the network structure of FIG. 14.

In this case, the resource availability information for each of the transmission apparatuses is revised so that the availability flags for the links d-f and e-c are set to OFF as shown in FIG. 19, because these links are not used by the standby channel LSP1 (P) anymore.

Figure 20:
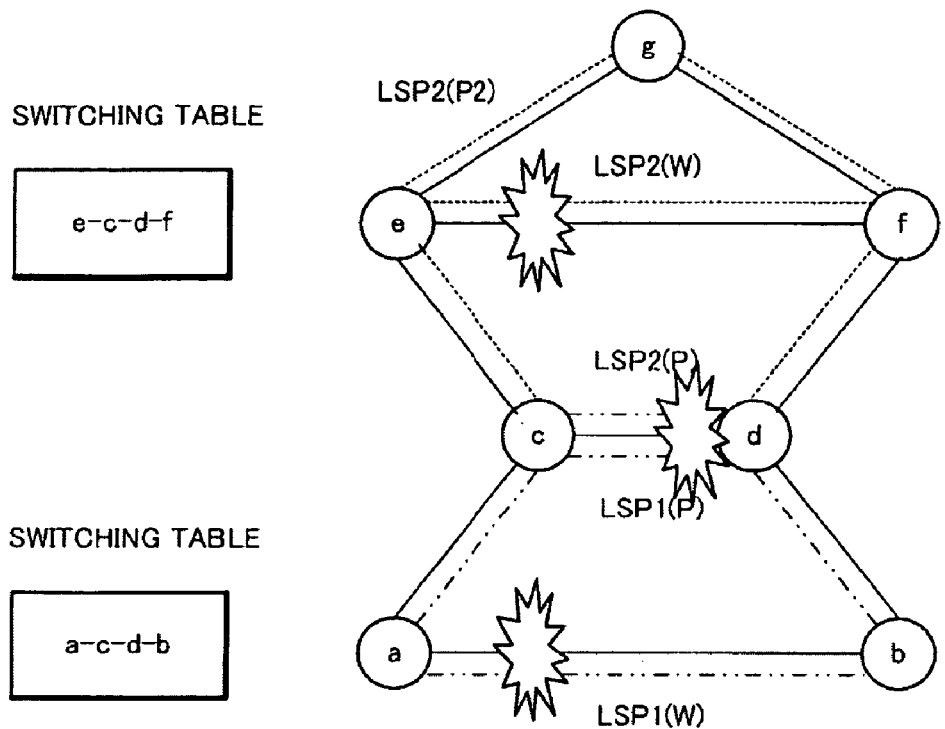
FIG. 20 is a diagram which shows a situation where a failure has occurred in the current channel LSP2(P) after the situation shown in FIG. 14.
Figure 21:
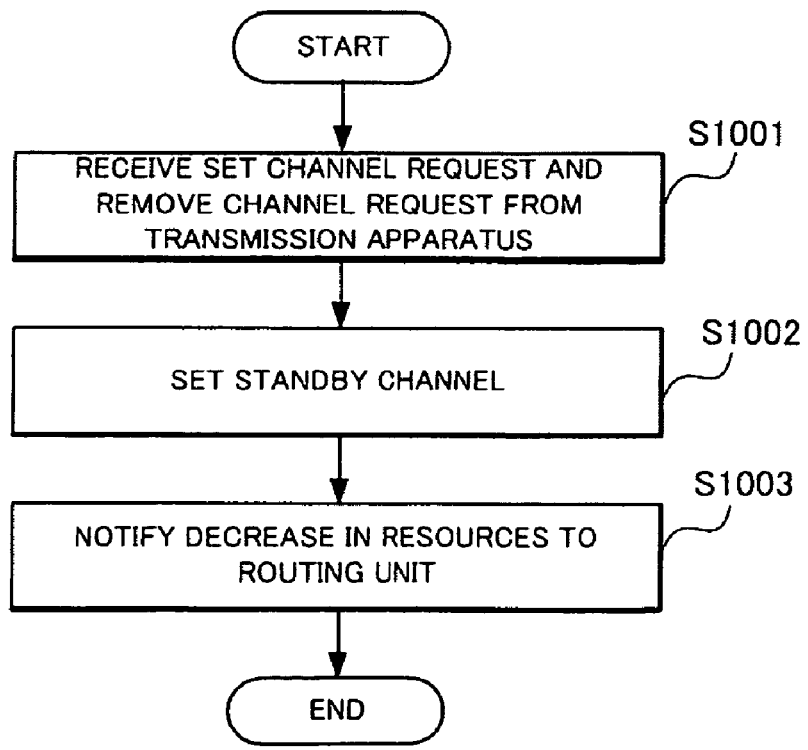
FIG. 21 is a flow chart which explains the channel switching operation performed in the situation shown in FIG. 20.
Figure 22:
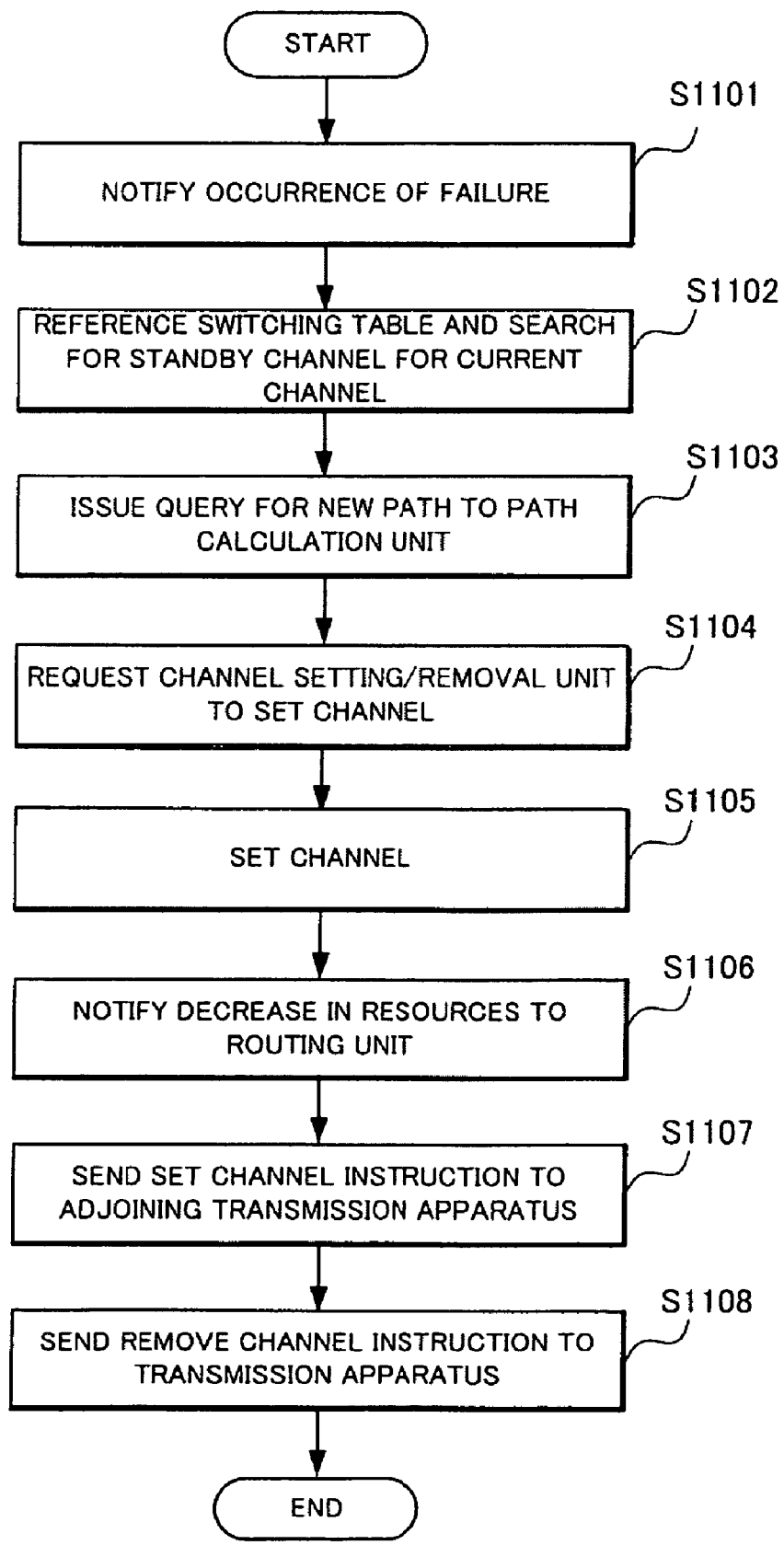
FIG. 22 is a flow chart which explains the channel switching operation performed in the situation shown in FIG. 20.
Figure 23:
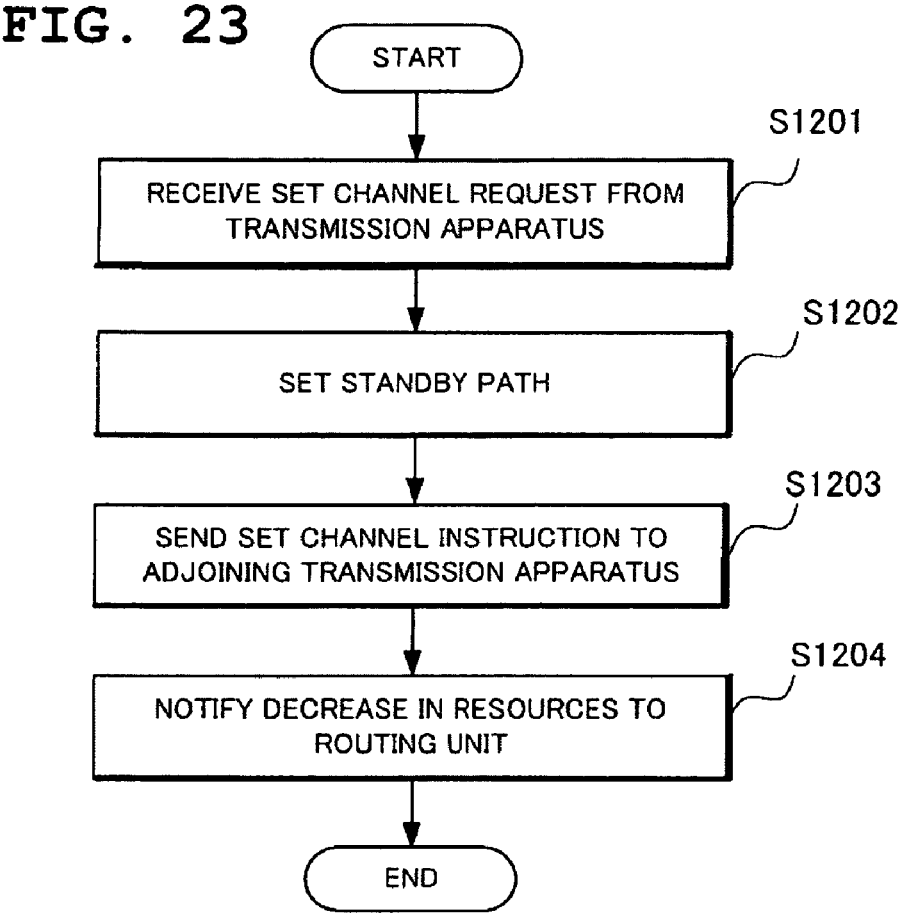
FIG. 23 is a flow chart which explains the channel switching operation performed in the situation shown in FIG. 20.
Figure 24:
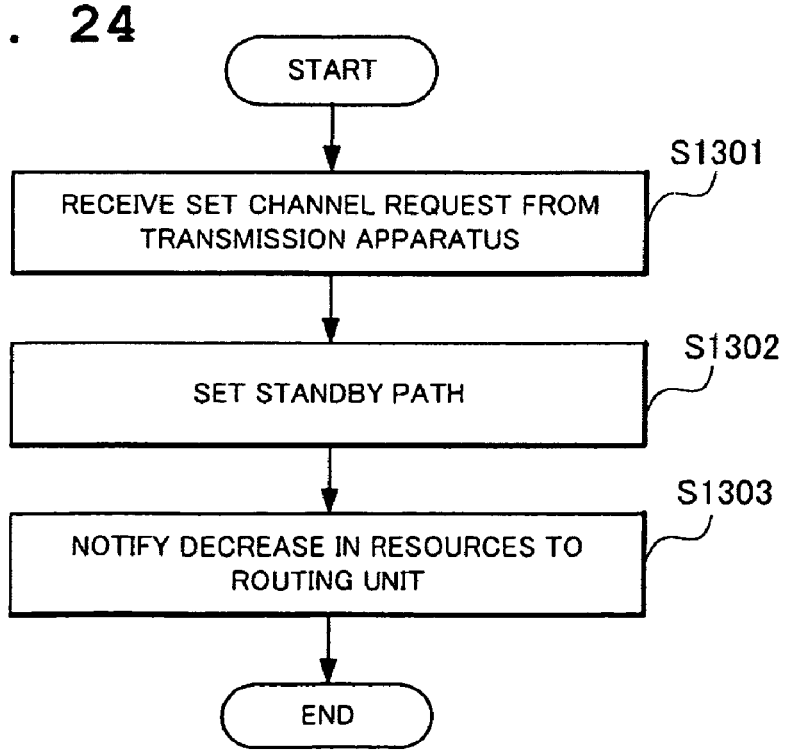
FIG. 24 is a flow chart which explains the channel switching operation performed in the situation shown in FIG. 20.

FIG. 20 shows a situation where a failure has occurred in the standby channel LSP2 (P) after the state shown in FIG. 14. The operation to switch a channel in this situation will be described below, with reference to FIGS. 21 to 26.

Both or either of the channel failure detection units 25 of the transmission apparatuses c, d notify/notifies the occurrence of a channel failure to the ingress transmission apparatus 11 (Step S1101). In this case, the transmission apparatus e serves as an ingress transmission apparatus 11 in FIG. 20.

Upon receipt of the channel failure notification from the transmission apparatus c, the channel switching unit 16 of the transmission apparatus e references the switching table 15 and searches for a standby channel for the current channel LSP2 (W) (Step S1102).

If the switching table 15 does not contain a standby path for the current channel LSP2 (W), the channel switching unit 16 issues a query to the path calculation unit 13 to check whether a new path exists or not (Step S1103). In this example, the switching table 15 of the transmission apparatus e does not contain any standby channel other than the standby channel LSP2 (P) as a standby channel for the current channel LSP2 (W), so the channel switching unit 16 issues a query for a new standby path to the path calculation unit 13.

In the case of FIG. 20, a path e-g-f (standby path LSP2 (P2)) as a standby path for the current channel LSP2 (W) between the transmission apparatuses e, f will be found as a result of the search.

The channel switching unit 16 of the transmission apparatus e issues a SET CHANNEL request with respect to the newly found standby path LSP2 (P2) to the channel setting/removal unit 12 (Step S1104), and the channel setting/removal unit 12 sets a channel for the standby path LSP2 (P2) (Step S1105). Then, in order to advertise the available resources of the transmission apparatus after setting the channel, the channel setting/removal unit 12 notifies a decrease in the resources to the routing unit 14 (Step S1106).

The channel setting/removal unit 12 of the transmission apparatus e issues a SET CHANNEL instruction with respect to the standby path LSP2 (P2) to the adjoining transmission apparatus g (Step S1107).

The channel setting/removal unit 22 of the transmission apparatus g receives the SET CHANNEL instruction from the transmission apparatus e (Step S1201); sets the standby path LSP2 (P2) according to the SET CHANNEL request (Step S1202); sends a SET CHANNEL instruction to the adjoining transmission apparatus f (Step S1203); and, in order to advertise the available resources of the transmission apparatus after setting the channel, notifies a decrease in the resources to the routing unit 23 (Step S1204).

The channel setting/removal unit 22 of the transmission apparatus f receives the SET CHANNEL instruction from the transmission apparatus g (Step S1301); sets the standby path LSP2 (P2) according to the SET CHANNEL request (Step S1302); and, in order to advertise the available resources of the transmission apparatus after setting the channel, notifies a decrease in the resources to the routing unit 23 (Step S1303).

The channel switching unit 16 of the transmission apparatus e issues a REMOVE CHANNEL request with respect to LSP2 (P) to the channel setting/removal unit 22 of the transmission apparatus c (Step S1108).

The channel setting/removal unit 22 of the transmission apparatus c receives the REMOVE CHANNEL request from the transmission apparatus e (Step S1401), and performs a channel removal operation on the standby channel LSP2 (P) (Step S1402). After confirming the successful removal of the standby channel LSP2 (P), the channel setting/removal unit 22 of the transmission apparatus c sends a REMOVE CHANNEL request with respect to the standby channel LSP2 (P) to the adjoining transmission apparatus d (Step S1403); and, in order to advertise the available resources of the transmission apparatus after setting the channel, notifies a decrease in the resources to the routing unit 23 (Step S1404).

The channel setting/removal unit 22 of the transmission apparatus d receives the REMOVE CHANNEL request from the transmission apparatus c (Step S1501); performs a channel removal operation on the standby channel LSP2 (P) according to the REMOVE CHANNEL request (Step S1502); after confirming the successful removal of the standby channel LSP2 (P), sends a REMOVE CHANNEL request with respect to the standby channel LSP2 (P) to the adjoining transmission apparatus f (Step S1503); and, in order to advertise the available resources of the transmission apparatus after setting the channel, notifies a decrease in the resources to the routing unit 23 (Step S1504).

The channel setting/removal unit 22 of the transmission apparatus f receives the REMOVE CHANNEL request from the transmission apparatus c (Step S1501); performs a channel removal operation on the standby path LSP2 (P) according to the REMOVE CHANNEL request (Step S1502); and after confirming the successful removal of the standby channel LSP2 (P), in order to advertise the available resources of the transmission apparatus after setting the channel, notifies a decrease in the resources to the routing unit 23 (Step S1503).

On completion of the procedure described above, the standby path LSP2 (P) is set between the transmission apparatuses e, g, f.

In this case, the resource availability information for each of the transmission apparatuses is revised so that the availability flags for the links e-g and g-f are set to OFF as shown in FIG. 27, because these links are not used by the standby channel LSP1 (P) anymore and the availability flags for the links d-f and e-c are set to ON.

Effects of the Exemplary Embodiment

According to the exemplary embodiment described above, the following effects can be obtained.

Firstly, a channel can be switched flexibly without needing to fix the channel to switch, because a switching table 15 is included to hold the path of the standby channels set by the user with respect to the transmission apparatus which serves as an ingress point in the network, so that the channel switching unit 16 can reference the switching table 15 when switching the current channel to a standby channel.

Secondly, the current channel can be switched to an appropriate channel with higher reliability, because switching is performed based on the priorities if two or more standby channels are shared at part of the channel.

Thirdly, channel switching can be performed as long as network resources are available, because the routing unit 14, 23, which increases or decreases the resource availability information, and the path calculation unit 13, which performs path calculation and searches for a new path through the use of the resource availability information, are provided to achieve channel switching based on the consideration of the band.

While the present invention has been described by taking a preferred exemplary embodiment and examples, it should be appreciated that the invention is not limited to such exemplary embodiment and examples but can be embodied with a variety of modifications without departing from the spirit and scope of its technical principle.

What is claimed is:

1. A transmission network having an ingress transmission apparatus and a relay or egress transmission apparatuses in network channel setting terms, wherein said ingress transmission apparatus including:
a switching table in which to register in advance a channel to switch to from a certain channel in the network;
a path calculation unit which calculates a channel path in said network and searches for a path to set;
a channel switching unit which switches a faulty channel in said network to a channel registered in said switching table or a channel found in a search by said path calculation unit; and
a channel setting/removal unit which sends a SET CHANNEL or REMOVE CHANNEL instruction to said relay or egress transmission apparatus,
wherein said channel switching unit of said ingress transmission apparatus
if said switching table does not contain any channel to switch to, issues a query for the existence of a new path to said path calculation unit; and
said path calculation unit calculates a channel path based on said query and searches for a path to set,
wherein said relay or egress transmission apparatus includes
a channel setting/removal unit which sets or removes a channel based on a SET CHANNEL or REMOVE CHANNEL instruction from said ingress transmission apparatus, and sends said SET CHANNEL or REMOVE CHANNEL instruction to an adjoining other transmission apparatus; and
a priority control unit which, if a channel to be newly set and the existing channel overlap with each other, compares priority between the channel to be newly set and the existing channel and, if the priority of the channel to be newly set is higher, sends a CHANNEL REMOVE notification with respect to said existing channel to said ingress transmission apparatus.

2. The transmission network according to claim 1, wherein, upon receipt of said CHANNEL REMOVE notification, the channel switching unit of said ingress transmission apparatus
if said switching table does not contain a standby channel for the channel to which said REMOVE notification relates, or if a new path determined by said path calculation unit does not exist, requests said transmission apparatus, which is the source of said REMOVE notification, to remove the channel by sending a CHANNEL REMOVE instruction with respect to the channel to which said CHANNEL REMOVE notification relates.

3. The transmission network according to claim 1, wherein said transmission apparatus holds resource availability information which includes information on links between two apparatuses, such links being resources utilized as network paths, as well as availability flags, each of such flags indicating whether or not each of the links is available, and includes a routing unit which turns on or off said availability flags based on a notification of an increase or decrease in such links caused by the setting or removal of the channel; and
said path calculation unit calculates a channel path by use of said resource availability information and searches for a path to set.

4. The transmission network according to claim 1, wherein said transmission apparatus includes a channel failure detection unit which detects a channel failure.

5. A transmission apparatus which is an ingress transmission apparatus in network channel setting terms, comprising:
a switching table in which to register in advance a channel to switch to from a channel in the network;
a path calculation unit which calculates a channel path in said network and searches for a path to set;
a channel switching unit which switches a faulty channel in said network to a channel registered in said switching table or a channel found in a search by said path calculation unit; and
a channel setting/removal unit which sends a SET CHANNEL or REMOVE CHANNEL instruction to a relay or egress transmission apparatus,
wherein said channel switching unit
if said switching table does not contain any channel to switch to, issues a query for the existence of a new path to said path calculation unit; and
said path calculation unit calculates a channel path based on said query and searches for a path to set,
wherein said relay or egress transmission apparatus includes
a channel setting/removal unit which sets or removes a channel based on a SET CHANNEL or REMOVE CHANNEL instruction from said ingress transmission apparatus, and sends said SET CHANNEL or REMOVE CHANNEL instruction to an adjoining other transmission apparatus; and
a priority control unit which, if a channel to be newly set and the existing channel overlap with each other, compares priority between the channel to be newly set and the existing channel and if the priority of the channel to be newl set is higher sends a CHANNEL REMOVE notification with respect to said existing channel to said ingress transmission apparatus.

6. The transmission apparatus according to claim 5, wherein, upon receipt of said CHANNEL REMOVE notification, the channel switching unit of said ingress transmission apparatus
if said switching table does not contain a standby channel for the channel to which said REMOVE notification relates, or if a new path determined by said path calculation unit does not exist, requests said transmission apparatus, which is the source of said REMOVE notification, to remove the channel by sending a CHANNEL REMOVE instruction with respect to the channel to which said CHANNEL REMOVE notification relates.

7. The transmission apparatus according to claim 5, wherein said transmission apparatus holds resource availability information which includes information on links between two apparatuses, such links being resources utilized as network paths, as well as availability flags, each of such flags indicating whether or not each of the links is available, and includes a routing unit which turns on or off said availability flags based on a notification of an increase or decrease in such links caused by the setting or removal of the channel; and
said path calculation unit calculates a channel path by use of said resource availability information and searches for a path to set.

8. The transmission apparatus according to claim 5, wherein a channel failure detection unit which detects a channel failure is included.

9. A channel switching method for a transmission network, which transmission network includes an ingress transmission apparatus and a relay or egress transmission apparatuses in network channel setting terms, wherein said ingress transmission apparatus performing the steps of:
if a failure occurs in said network, switching said failed channel to a channel found by searching through a switching table in which channels to switch to from channels in said network are registered or to a channel path in said network determined by calculation by a path calculation unit; and sending a SET CHANNEL or REMOVE CHANNEL instruction to a relay or egress transmission apparatus, wherein said ingress transmission apparatus if said switching table does not contain any channel to switch to, issues a query for the existence of a new path to said path calculation unit; and said path calculation unit calculates a channel path based on said query and searches for a path to set, wherein said relay or egress transmission apparatus performs the steps of:

setting or removing a channel based on a SET CHANNEL or REMOVE CHANNEL instruction from said ingress transmission apparatus, and sending said SET CHANNEL or REMOVE CHANNEL instruction to an adjoining other transmission apparatus; and if a channel to be newly set and the existing channel overlap with each other, comparing priority between the channel to be newly set and the existing channel and, if the priority of the channel to be newly set is higher, sending a CHANNEL REMOVE notification with respect to said existing channel to said ingress transmission apparatus.

10. The channel switching method for a transmission network according to claim 9, wherein, upon receipt of said CHANNEL REMOVE notification, said ingress transmission apparatus if said switching table does not contain a standby channel for the channel to which said REMOVE notification relates, or if a new path determined by said path calculation unit does not exist, requests said transmission apparatus, which is the source of said REMOVE notification, to remove the channel by sending a CHANNEL REMOVE instruction with respect to the channel to which said CHANNEL REMOVE notification relates.

11. The channel switching method for a transmission network according to claim 9, wherein said transmission apparatus performs the step of holding resource availability information which includes information on links between two apparatuses, such links being resources utilized as network paths, as well as availability flags, each of such flags indicating whether or not each of the links is available, and turning on or off said availability flags based on a notification of an increase or decrease in such links caused by the setting or removal of the channel; and causes said path calculation unit to calculate a channel path by use of said resource availability information and search for a path to set.

12. A non-transitory computer-readable storage medium for storing a channel switching program which causes an ingress transmission apparatus of a transmission network including said ingress transmission apparatus and a relay or egress transmission apparatus in network channel setting terms to perform the processes of:

if a failure occurs in said network, switching said failed channel to a channel found by searching through a switching table in which channels to switch to from channels in said network are registered or to a channel path in said network determined by calculation by a path calculation unit; and sending a SET CHANNEL or REMOVE CHANNEL instruction to a relay or egress transmission apparatus, wherein said channel switching program causes said ingress transmission apparatus to if said switching table does not contain any channel to switch to, perform the process of issuing a query for the existence of a new path to said path calculation unit; and cause said path calculation unit to perform the process of calculating a channel path based on said query and searching for a path to set, wherein said channel switching program causes said relay or egress transmission apparatus to perform the processes of:

setting or removing a channel based on a SET CHANNEL or REMOVE CHANNEL instruction from said ingress transmission apparatus, and sending said SET CHANNEL or REMOVE CHANNEL instruction to an adjoining other transmission apparatus; and if a channel to be newly set and the existing channel overlap with each other, comparing priority between the channel to be newly set and the existing channel and, if the priority of the channel to be newly set is higher, sending a CHANNEL REMOVE notification with respect to said existing channel to said ingress transmission apparatus.

13. The non-transitory computer-readable storage medium according to claim 12, wherein said channel switching program causes said ingress transmission apparatus to, upon receipt of said REMOVE CHANNEL notification, perform the process of:

if said switching table does not contain a standby channel for the channel to which said REMOVE notification relates, or if a new path determined by said path calculation unit does not exist, requesting said transmission apparatus, which is the source of said REMOVE notification, to remove the channel by sending a CHANNEL REMOVE instruction with respect to the channel to which said CHANNEL REMOVE notification relates.

14. The non-transitory computer-readable storage medium according to claim 12, wherein said channel switching program causes said transmission apparatus to perform the process of holding resource availability information which includes information on links between two apparatuses, such links being resources utilized as network paths, as well as availability flags, each of such flags indicating whether or not each of the links is available, and turning on or off said availability flags based on a notification of an increase or decrease in such links caused by the setting or removal of the channel; and causes said path calculation unit to perform the process of calculating a channel path and searching for a path to set by use of said resource availability information.

* * * * *